Patented Aug. 11, 1942

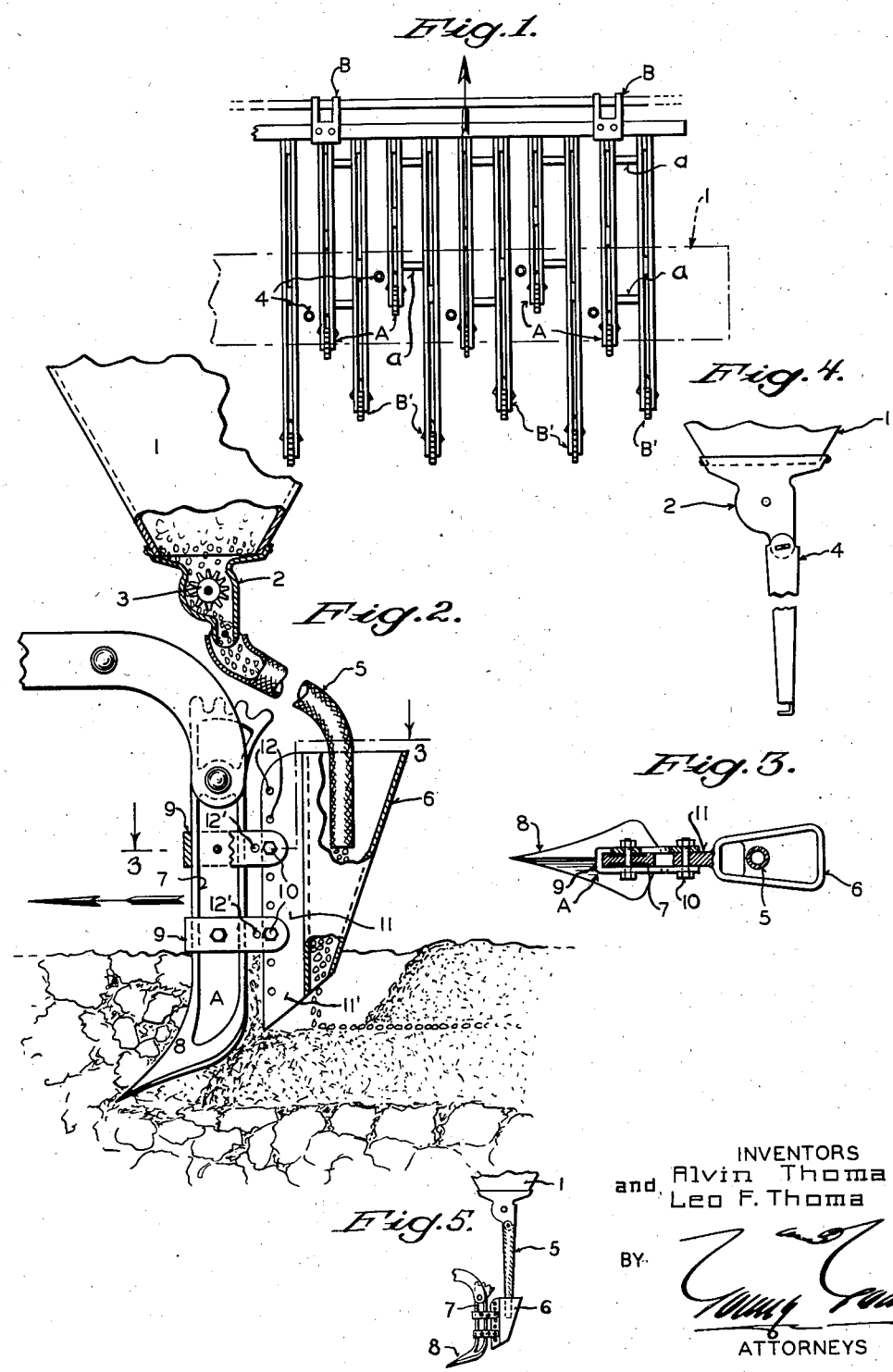

2,292,909

UNITED STATES PATENT OFFICE 2,292,909

SEEDER

Alvin Thoma and Leo F. Thoma,
Watertown, Wis.

Application March 8, 1941, Serial No. 382,298

1 Claim. (Cl. 111—86)

Our invention refers to cultivator seeders, the same being an improvement upon the J. Thoma et al. Patent No. 1,491,324.

The present machine contemplates what might be termed a one operation seeder which is so constructed and arranged that it may be utilized for selective broadcasting or drill seeding.

The primary object of the present invention is to provide, in addition to broadcasting, means whereby seed, such as peas or the like, may be planted at a selected depth upon soft prepared soil, and thereafter said seeds are covered with pulverized soil. Hence, the gang of drills prepare the seed bed and the earth in one operation.

Another object of the invention is to provide a gang of cultivator or hoe teeth properly spaced apart transversely, and also positioned in front and back groups staggered in relation to each other, whereby clods in the soil are thoroughly broken up, and due to the spaced position of the gangs with relation to each other, corn-stalks, stubs, or other foreign matter will clear between the hoes, whereby clogging of the hoes or teeth is eliminated, it being understood that the seeder in one operation will prepare the soil for planting and deposit the seed in the desired manner.

Another specific object of the invention is to provide a gauge mechanism associated with the hoes or teeth which may be readily adjusted with relation to the heel of the teeth to control the depth of planting in a drilling operation.

A further object of the invention is to provide a discharge boot for the seed which delivers the same to the heel or rearward portion of the teeth whereby the same are protected against deflection by the wind and also prevent the seed from dropping in crevices in the ground as it is agitated when the seed strikes the same.

With the above and other objects in view, the invention consists in certain peculiarities of construction and arrangement of parts, as will be hereinafter fully set forth in connection with the accompanying drawing.

In the drawing:

Figure 1 represents a diagrammatic plan view of a gang of seeder teeth with their associated draw bars indicating the step by step or staggered positions of the various hoes or teeth.

Figure 2 is a detailed fragmentary elevation of one of the teeth and its associated bar together with a standard seeder box and adjustable boot embodying the features of our invention, the same being partly broken away and in section to more clearly illustrate structural features.

Figure 3 is a detailed sectional plan view of the same, the section being indicated by line 3—3 of Figure 2;

Figure 4 is a side elevational view of the seeder box illustrating standard removable broadcasting leg suspended from the seeder cup; and Figure 5 is an elevational view of the drill mechanism showing a straight spout.

Referring by characters to the drawing A indicates the forward group of teeth and their associated draw bars which are suitably suspended from an oscillating hanger B attached to the seeder in any desired manner not shown. B' indicates the rear group of teeth or hoes and their associated draw bars suitably staggered and spaced at desired distances between the first group of teeth. As indicated in full lines in Figures 2 and 4, and in dotted lines in Figure 1, we provide any suitable seeder box 1 having attached thereto the usual seeder cup 2 and a rotating wheel 3 for positive delivery of a predetermined volume of seed.

As shown in Figure 4, the seeder cup has detachably suspended therefrom a broadcasting seeder leg 4, the positions of the same being also indicated in Figure 1 by the same numeral.

In the ordinary broadcasting operation, the broadcasting legs 4 are usually positioned forwardly of the hoe drills, and the seeder box is also used in a position forwardly thereto. Hence, when the machine is to be used as a drill, the broadcasting legs 4, which are attached to the seeder cup by a bolt or cotter pin, are removed, and a flexible drill seeder spout 5 is attached to the seeder cup as indicated in Figure 2 of the drawing. A receiving boot 6 is also attached to the shank 7 of a winged drill tooth or hoe 8, as shown in Figures 2 and 3 of the drawing.

The boot attaching means comprises a pair of clips 9 which are bolted or otherwise secured to the shank 7. Ends of the clips extend backwardly and are perforated for the reception of bolts or cotter pins 10, the same serving as detachable securing means for the boots which are provided with forwardly extended fins 11. The lower pointed end 11' of said fins serves as a gauge positioned just rearwardly of the hoe winged tooth 8 or at the heel of the same.

The fins are provided with a vertical row of bolt apertures 12 for the reception of the bolts 10 and by this means the boot is adjusted vertically up or down with relation to the heel of the tooth 8, whereby the pointed ends 11' will determine the depth upon which the seeds are deposited in a drilled operation, it being understood that the boot has a discharge mouth located at its lower end and above the pointed or gage end of the fin.

Hence it will be seen that the boot or funnel 6 which receives the seed to be drilled through the spout 5, can be gauged accurately to determine the depth that the seed will be planted, it being understood that the point of the hoe or tooth determines the full depth to which the soil is plowed. It is also contemplated to adjust the boots at an angle in some instances which is accomplished by placing the bolt 10, for example, in the perforation 12' of the lower clip 9.

As shown in Figure 1, the gangs of teeth are connected in sets of two by clip brackets a. The short tooth in each instance is fastened to the adjacent longer tooth to support the short tooth and hold the same in the ground as well as to prevent it from traveling sideways. In other words the long tooth holds the short tooth rigid as to depth relative to said long tooth.

While we have shown a straight depending broadcasting leg 4 and a somewhat curved drill leg 5, as shown in Figure 2, it is understood that in practice the seeder box 1 may be adjusted with relation to the frame of the seeder and by this shift, as best illustrated in Figure 5 of the drawing, the seeder leg 5 may assume a vertical position with relation to the boot.

In practice the seeder leg 5 may be slightly curved and it will operate successfully with peas or similar seed, but might have a tendency to clog oats or the like. Hence the adjustment of the seeder box will eliminate the curving of the leg 5 as shown in Figure 5.

From the foregoing description it will be noted that the associated group of teeth positioned as indicated in Figure 1 will thoroughly plow and pulverize the soil to a uniform depth, and in the drilling operation, the gauge boots 6 will determine the depth of the planting, and position below said depth a predetermined layer of soft earth serving as a bed for reception of the seed. Thereafter, the seeds are covered by a similar soft bed of earth to the surface line of the ground as indicated in Figure 2. This covering operation and pulverizing of the ground being attained by the successive cutting or plowing of the soil as the seeder travels forwardly.

While we have shown one exemplification of our invention and described it as to detail, it is understood that we may vary such detail within the scope of the claim.

We claim:

A seeder comprising a shank terminating with a winged cultivator tooth, a boot closely associated with the shank terminating with a seed discharge opening in juxtaposition to the cultivator tooth and normally above the same, a fin extending from the boot towards the shank having a gage point below the boot discharge, the fin being provided with a series of bolt-receiving apertures, ears extending rearwardly of the aforesaid shank and bolts carried by the ears for engaging the fin apertures whereby the boot is both vertically and angularly adjusted to regulate the seed discharge mouth with reference to the cultivator tooth.

ALVIN THOMA.
LEO F. THOMA.